US008380344B2

United States Patent
Herrmann

(10) Patent No.: US 8,380,344 B2
(45) Date of Patent: Feb. 19, 2013

(54) METHOD AND SYSTEM FOR TAMPING MEDIA DURING TRANSPORTATION

(75) Inventor: Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 466 days.

(21) Appl. No.: 12/702,265

(22) Filed: Feb. 8, 2010

(65) Prior Publication Data

US 2011/0196531 A1 Aug. 11, 2011

(51) Int. Cl.
*G06F 7/00* (2006.01)
*G06F 17/00* (2006.01)
*B65G 47/10* (2006.01)
*B65G 47/46* (2006.01)
*B65G 37/00* (2006.01)
*G05B 19/18* (2006.01)

(52) U.S. Cl. ........ 700/230; 700/223; 700/244; 700/253; 198/370.1; 198/368; 198/890; 198/351; 198/349.1

(58) Field of Classification Search .................. None
See application file for complete search history.

(56) References Cited

U.S. PATENT DOCUMENTS

2005/0072652 A1* 4/2005 Mills et al. ................ 198/370.1

\* cited by examiner

*Primary Examiner* — Gene Crawford
*Assistant Examiner* — Yolanda Jones
(74) *Attorney, Agent, or Firm* — Joseph E. Root

(57) ABSTRACT

A method for tamping media during transportation is disclosed. Multiple parallel beltsets lie between an inlet station (s) and a delivery station(s). The multiple parallel beltsets have one or more parallel belts, a motor connected to drive the beltsets, and multiple pushers attached to the belts of the beltset with the pushers of one beltset placed between the pushers of the adjacent beltset. A control module coupled to the motors accepts a set of instructions and controls tamping of the media stack during transportation. The control module varies the velocity of one of the beltsets relative to the adjacent beltset and adjusts the distance between successive pushers on the beltsets to accept media or to tamp media during transportation.

22 Claims, 6 Drawing Sheets

METHOD AND SYSTEM FOR TAMPING MEDIA DURING TRANSPORTATION

TECHNICAL FIELD

The presently-disclosed embodiments generally relate to material handling and transportation, and more particularly, to tamping media in material-handling systems.

BACKGROUND

Material-handling systems transport media (envelopes, boxes, cards, sheet material including paper, corrugated cardboard, mail or the like or stacks of sheet material) from input station(s) to output station(s). A conveyor system, for example, may transport any number of media items between an inlet station(s) and a delivery station(s). Belts of the conveyor system carry stacks of media between two successive pushers (elongated members, attached to a belt at predetermined locations, separating two sections of the belt and being capable of pushing media on the conveyor system) on the conveyor system.

Pusher transport systems encounter the problem of misregistration or misalignment of media in a stack. The misregistration of a media stack can occur due to addition of media in an unregistered state to a media stack, addition of media leading to an unregistered stack, and transportation of the media stack, where movement can lead to an unregistered media stack. For example, in a mailing system where differently sized media is added to a media stack during transport, misregistration can occur. Further, the mailing system may involve inserting the media stack into an envelope, necessitating proper registration of the media stack. Presently, hold down straps and brushes placed at fixed locations above the conveyer system are employed for tamping an unregistered media stack. A change in the size or type of media causes significant delay in media transport, as an adjustment to the hold down straps or brushes becomes necessary.

It would be highly desirable to have a relatively simple and cost-effective system for combining high production on a material-handling system with the ability to vary the distance between successive pushers automatically for tamping media stacks during transport.

SUMMARY

An aspect of the disclosure provides a method for tamping media during transportation. Multiple parallel beltsets include one or more parallel belts, which carry media stacks and lie between an inlet station and a delivery station. Each beltset includes a motor for driving the beltset. Multiple pushers are attached to the belts of the beltset, such that the distance between two successive pushers is greater than the size of the largest media to be transported. Further, the pushers of one beltset lie between successive pushers of the adjacent beltset. A media stack is tamped at least once during transport by a control module at predetermined time intervals. The control module accepts a set of instructions and defines a velocity profile for the beltsets, thereby varying the distance between two successive pushers on the beltsets.

Another embodiment disclosed here is a transport system for tamping media during transportation. The transport system employs multiple parallel beltsets, carrying media stacks, situated between an inlet station and a delivery station. Each beltset includes one or more parallel belts along with a motor, which drives the beltset. Each beltset also includes multiple pushers attached to one or more belts of the beltset, such that the distance between two successive pushers is greater than the size of the largest media to be transported. Further, the pushers of one beltset lie between successive pushers of the adjacent beltset. A control module, coupled with all the motors, tamps the media stack at least once during transport of the media stack and may do so at predetermined time intervals. The control module accepts a set of instructions and defines the velocity profile of the beltsets, thereby varying the distance between two successive pushers on the beltsets.

DETAILED DESCRIPTION

Figure 1:
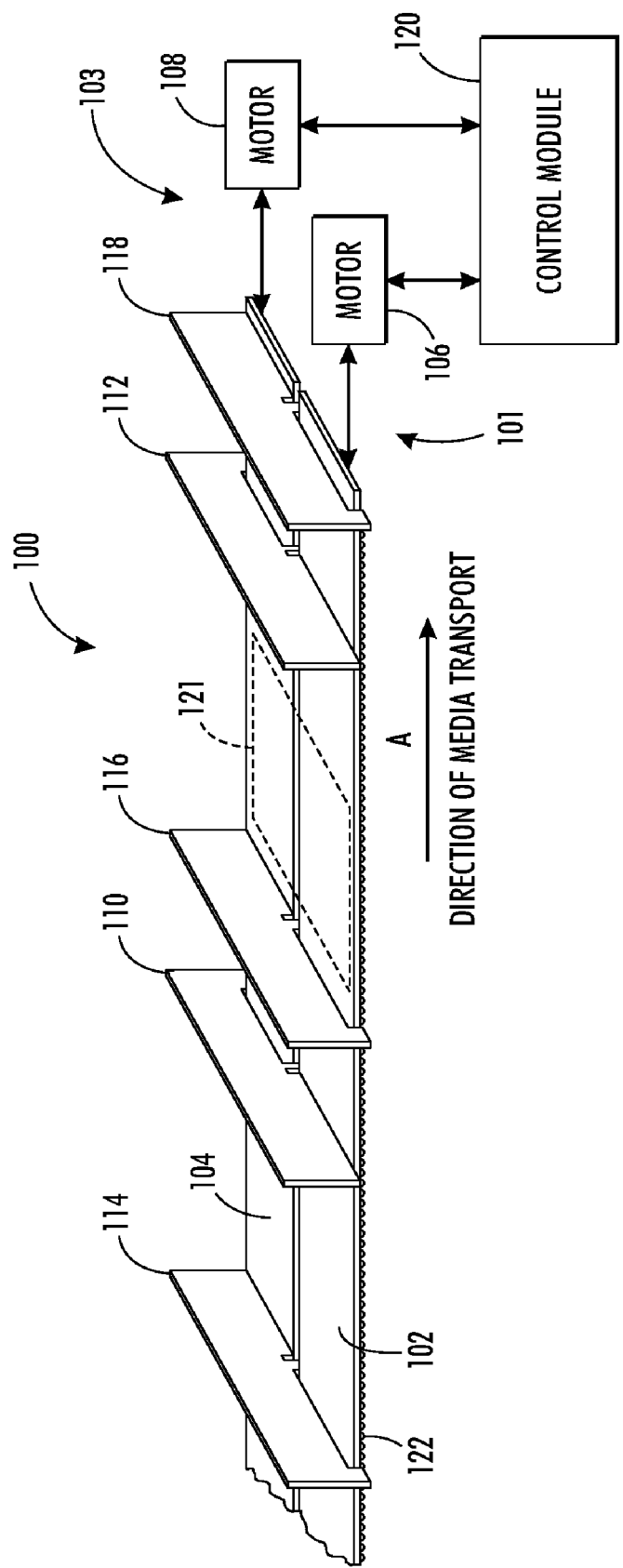
FIG. 1 illustrates an exemplary embodiment of a transport system for tamping media stacks during transportation.

The following detailed description is made with reference to the figures. Preferred embodiments are described to illustrate the claimed invention, not to limit its scope, which is defined by the claims. Those of skill in the art will recognize a variety of equivalent variations for the embodiments described.

As used throughout this disclosure, the term "media" refers to envelopes, boxes, cards, sheet material including paper, corrugated cardboard, mail or the like, stacks of sheet material, or other suitable items. It should be understood that the concepts set out here could be employed both in devices handling relatively small-sized media, such as paper sheets, as well as transport systems handling large sheets of material, such as corrugated cardboard. A "beltset" carries media stacks between at least one inlet station and at least one delivery station. Further, each beltset may include a single or multiple parallel belts connected to a motor, which drives the beltset. Multiple pushers are attached to the one or more belts of the beltset. A "pusher" is an elongated member protruding from a belt in a transporting system, separating two sections of the belt. The pushers are designed to push a media stack on a beltset. Further, a pusher's location can be changed if the pusher is detachable from the belt. The term "bin size" refers to the distance between two successive pushers on the transporting system; each of the two successive pushers on the transporting system will generally lie on separate beltsets, according to the embodiments of the claimed invention. The pushers may be designed either to be individual pushers on each belt or to span the width of one or more belts. The pushers may even extend across the entire width of a single beltset or of all the beltsets in the transporting system. Alternatively, the pushers can span all belts of a beltset but may not cover the entire width of the beltset. Further, in some embodiments, the pushers may not be present on all belts of a beltset. The term "media size" refers to the size of the media. The term "TE pushers" (trailing edge pushers) refers to pushers facing the trailing edge of the media during transportation, while the term "tamping pushers" refers to pushers moving relative to fixed TE pushers during a tamping operation.

This disclosure describes methods and systems for tamping stacks of media during transportation on a transport system. Stacks of media are carried on beltsets extending between inlet and delivery stations. Pushers are attached to the belts of a beltset, as described above, and successive pushers of a beltset are spaced apart a distance greater than the size of the largest media transported. Typically, the pushers of one beltset lie between successive pushers of the adjacent beltset. Pushers tamp each media stack at least once during transport. A control module directs the tamping operation by accepting a set of instructions, defining a velocity profile for the multiple beltsets, and varying the distance between two successive pushers on the transport system during transport.

FIG. 1 illustrates an exemplary embodiment of a transport system 100 for tamping media stacks during transportation, ensuring that the media stacks remain registered. In the present embodiment, the transport system 100 carries media stacks between an inlet station (not shown) and a delivery station (not shown) and can be implemented in any suitable material-handling application. The inlet and the delivery stations may be printers, storage or collection areas, or processing units, or the inlet and delivery stations may be part of a material-handling system.

The transport system 100 includes a first beltset 101 having a first belt 102 and a second beltset 103 having a second belt 104 parallel to the first belt 102. The first beltset 101 further includes a first motor 106 that drives the first belt 102, while a second motor 108, part of the second beltset 103, drives the second belt 104. As depicted in FIG. 1, the transport system 100 transports media stacks in direction A. Tamping pushers 110, 112, attached to the first belt 102, form part of the first beltset 101 while TE pushers 114, 116, 118, attached to the second belt 104, form part of the second beltset 103. Although the tamping pushers 110, 112 are attached only to the first belt 102, these tamping pushers 110, 112 span the second belt 104 as well, without making contact with the second belt 104. The pushers spanning all the belts of the transport system prevent smaller-sized media (which does not span all the belts of the transport system) from becoming unregistered due to rotating or shifting. Part of a pusher may protrude from the lower part of the pusher, as shown in FIG. 1, preventing the media stacks from rotating or becoming trapped, for example, in the space between the tamping pusher 110 and the second belt 104. Such protrusions may exist at various points along the length of a pusher and may lie between two adjacent belts or toward the outer edges of the two outer belts of the transport system 100, as illustrated in FIG. 1.

A control module 120 tamps the media stack at least once during its transport. As shown in FIG. 1, the tamping pusher 112 and the TE pusher 116 form a bin 121 for carrying a media stack (not shown in FIG. 1 for simplicity). Typically, bin size decreases during a tamping operation. In the present embodiment, during a tamping operation the control module 120 changes the bin size by varying the velocity of the first belt 102. In an alternate embodiment, during a tamping operation the control module 120 may change the bin size by varying the velocity of either one of the first belt 102 and the second belt 104 or both.

The control module 120 defines a velocity profile for one or both of the first motor 106 and the second motor 108 and corresponding belts. The control module 120 is coupled to both the first motor 106 and the second motor 108, such that the two motors operate independently. For example, in order to perform a tamping operation, the control module 120 may actuate either the first motor 106 or the second motor 108 at predetermined time intervals to vary the bin size. Alternatively, the control module 120 may actuate both the first motor 106 and the second motor 108 at predetermined time intervals to vary the bin size. As shown in FIG. 1, the control module 120 actuates the first motor 106 during a tamping operation, leading to the movement of the first belt 102 and the attached tamping pushers 110, 112. During normal transport, the control module 120 actuates both the first motor 106 and the second motor 108, such that the first belt 102 and the second belt 104 move in direction A, in FIG. 1, at the same velocity. This movement results in transport of the media stack in direction A. Belt teeth 122 may extend continuously on the inner surface of a belt from one edge to the other and help in achieving synchronization during belt movement.

Furthermore, additional inlet stations may exist, inserting media into the media stacks during transportation from the inlet station to the delivery station. One example places the additional inlet stations above the belts, dropping additional media onto the media stack from above. To ensure the capture of additional media, the control module 120 increases the bin size. It is evident that for these and similar purposes, varying the bin size may be required.

In certain embodiments, the control module 120 may also accept a set of instructions specifying various parameters determining the belt movement. The set of instructions can specify, for example, type of media, size of media, size of the media stack, the locations of the inlet or delivery stations, and other such parameters, which aid in determining tamping requirements.

Furthermore, the belts of the transport system 100 may be formed of urethane, co-polyester, or rubber. Optionally, the belts can be metallic or may further be chains with attached pushers, as commonly used in a mail handling equipment. In addition, the belts are sometimes reinforced with steel or Kevlar cords. Moreover, the belts or chains may be mounted below a baffle so that only the pushers project through the baffle. The baffle design allows the media stack to make contact only with the pushers, preventing contact of the media stack with the upper surface of the chains or belts and lowering the possibility of media shifting. To this end, the structure of the belts may be rough, smooth, or may include ridges depending upon the nature of the media. For example, the belt may have a rough surface for better transportation of relatively smooth items, such as glossy photo paper. It will be evident to those skilled in the art that the belts may be manufactured using similar material, for example, carbon fiber reinforcements.

Joining the TE pushers 114, 116, 118 and the tamping pushers r to the belts 104 and 102 respectively may include any of various mechanical coupling methods, such as welding, bolting, applying a groove & pulley mechanism, and chemical melting. In one implementation, integral and sequential formation of the belt teeth 122 with a belt requires molding the belt teeth 122 with the belt. In a further implementation, the belt teeth 122 can be urethane teeth.

As shown in FIG. 1, the TE pushers 114, 116, 118 and the tamping pushers 110, 112 span the width of the second belt 104 and the first belt 102, respectively. It will be clear to those skilled in the art that there exist several conceivable pusher structures, in addition to those described later, that may be employed for forming bins of varying sizes and performing tamping operations.

Figure 2:
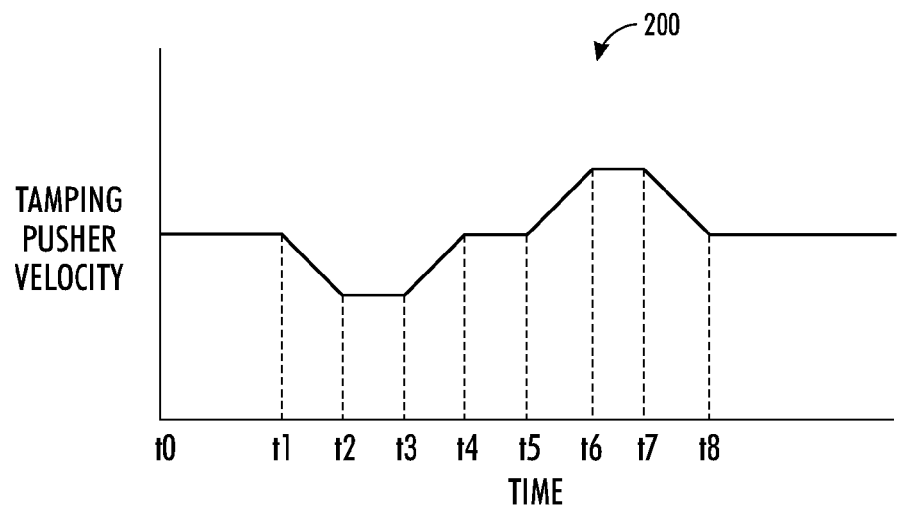
FIG. 2 illustrates an exemplary velocity profile 200 for the tamping pushers.
Figure 3:
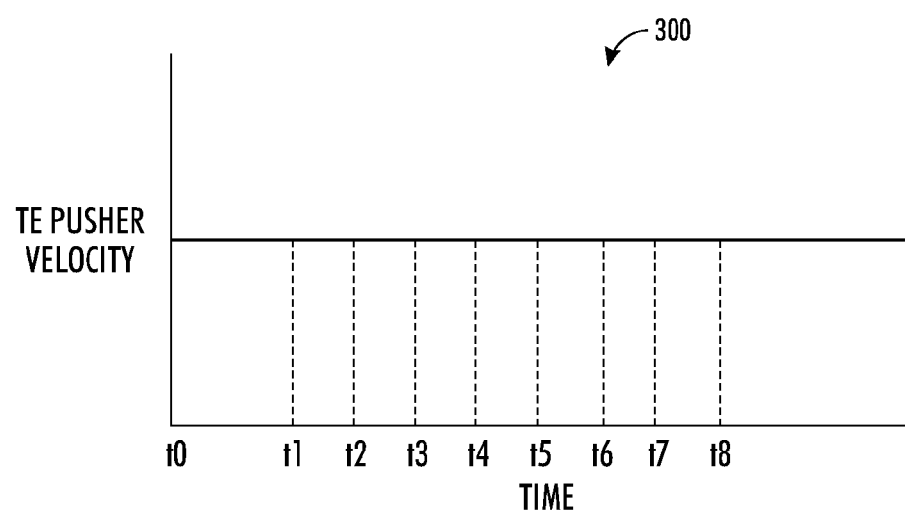
FIG. 3 illustrates an exemplary velocity profile 300 for the TE pushers.

FIGS. 2 and 3 display velocity profiles 200, 300, illustrating the actions of the tamping pushers 110, 112 and TE pushers 114, 116, 118 during a tamping operation. In general, tamping is accomplished by decelerating the tamping pushers, so that the sets of pushers move closer together. That relative movement results in the pushers' tamping a media stack. The tamping pushers are then accelerated until they reinstate the original spacing.

It will be noted that the illustrated embodiment executes a tamping operation by varying the velocity of the tamping pushers 110, 112 (shown in FIG. 2) while the TE pushers 114, 116, 118 travel at a constant velocity (shown in FIG. 3). In an initial phase, from time t0 to t1, representing normal transport, all of the pushers travel at the same velocity. Tamping is initiated at t1, by decelerating tamping pushers 110, 112, the deceleration continuing until time t2, where the tamping pushers reach a selected tamping velocity (that is, velocity differential between the sets of pushers). The tamping velocity is chosen to provide sufficient impact on the media stack to perform the tamping, but not so much impact that media might be damaged. This tamping velocity is maintained from t2 to t3, a period calculated to bring the sets of pushers exactly close enough to provide tamping, but not so close that media are damaged during tamping.

At t3, the system anticipates the completion of the tamping operation by accelerating tamping pushers he tamping pushers 110, 112, and continuing that acceleration from t3 to t4, where they match the velocity of TE pushers 114, 116, 118. Although the tamping pushers 110, 112 are accelerating during this period, their velocity remains below that of the TE pushers 114, 116, 118, so the sets of pushers continue to move closer together, tamping the media stack. The two sets of pushers reach their closest proximity at t4. The sets of pushers remain in that fully tamping position from t4 to t5, allowing the media stack to settle.

Starting at t5, the pushers are returned to their fully separated positions for normal transport. The velocity profile from t5 to t8 in the illustrated embodiment is the inverse of that from t1 to t4, accelerating at a constant rate from t5 to t6, holding at a selected separation velocity (the velocity differential between the sets of pushers, with the tamping pushers 110, 112 moving faster), and then decelerating from t7 to t8. The final deceleration equalizes the velocity of the two belts for continued normal transport.

Velocity profiles, such as profiles 200, 300, can be prepared for each of the media that the transport system might encounter. Factors that must be taken into account in designing such profiles are the media sizes, which dictate the minimum spacing between pusher sets, and media makeup, which influences the tamping velocity (a higher tamping velocity being beneficial for media such as card stock, but lower tamping velocities being required for thin sheet media). It will be noted from FIGS. 2 and 3 that the exemplary profiles set out here are generally trapezoidal in form, with constant acceleration and deceleration portions (such as from t1 to t2, FIG. 2). Also, the tamping and separation profiles (t1-t4 and t5-t8) are inversions of each other. Other profiles can be designed, with those of skill in the art able to understand the relationships between media handling needs and pusher velocities, as set out above.

Figure 4:
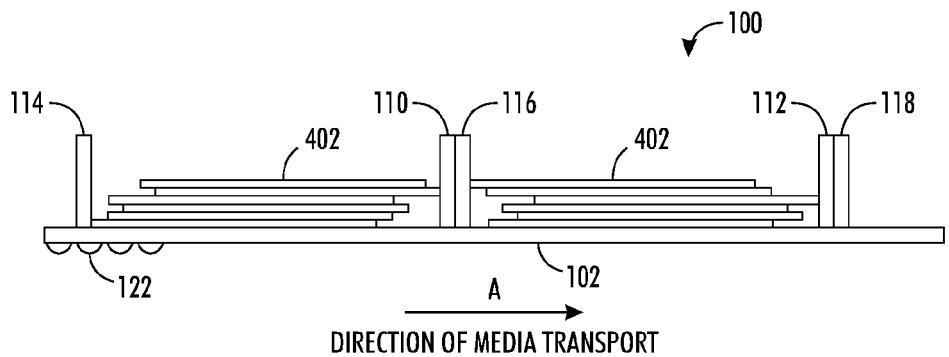
FIG. 4 is an alternate view of the transport system of FIG. 1, carrying unregistered media stacks.
Figure 5:
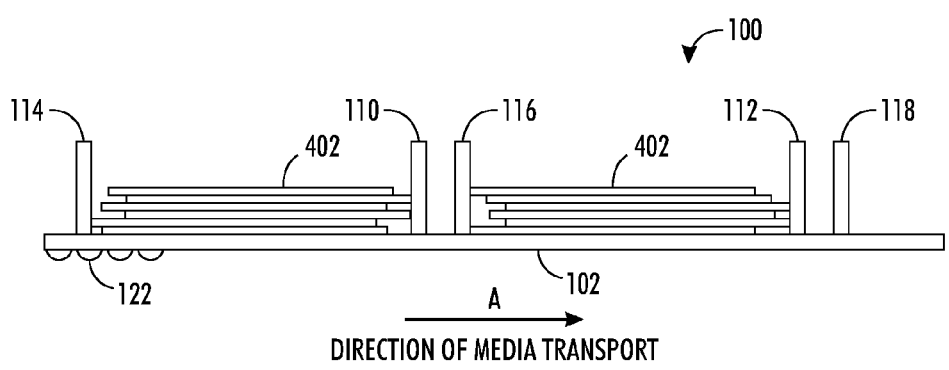
FIG. 5 is an alternate view of the transport system of FIG. 1, implementing a tamping operation on the unregistered media stacks.
Figure 6:
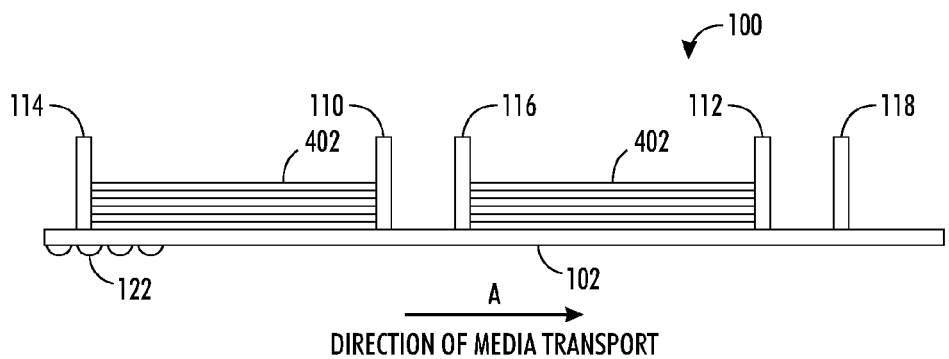
FIG. 6 is an alternate view of the transport system of FIG. 1, carrying the registered media stacks after the tamping operation.

FIGS. 4-6 depict a tamping operation from start to finish. FIG. 4 shows the transport system 100 of FIG. 1, carrying media stacks 402. As can be seen, the media stacks 402 have become unregistered during the transportation. This figure corresponds to the situation at t0-t1 in FIG. 2.

FIG. 5 depicts the initiation of a tamping operation. Here, the control module 120 actuates the first motor 106 to move the first belt 102 and the corresponding tamping pushers 110, 112 toward TE pushers 114, 116 by decreasing the velocity of the second belt 104. The situation depicted here corresponds to the situation at some time from t1 to t4 in FIG. 2.

FIG. 6 depicts the culmination of the tamping operation, corresponding to the situation at t4-t5 in FIG. 2. Here, tamping pushers 110, 112 have engaged the media stacks 402 and pushed them into complete registration. For implementations in which the velocity profile corresponds to that shown in FIG. 2, the tamping pushers 110, 112 move back to their original position or another position, as specified by the velocity profile. Alternatively, if no more media are to be added to the stacks 402, then the pusher sets can remain in the position depicted until the media stacks 402 are ready for removal.

Figure 7:
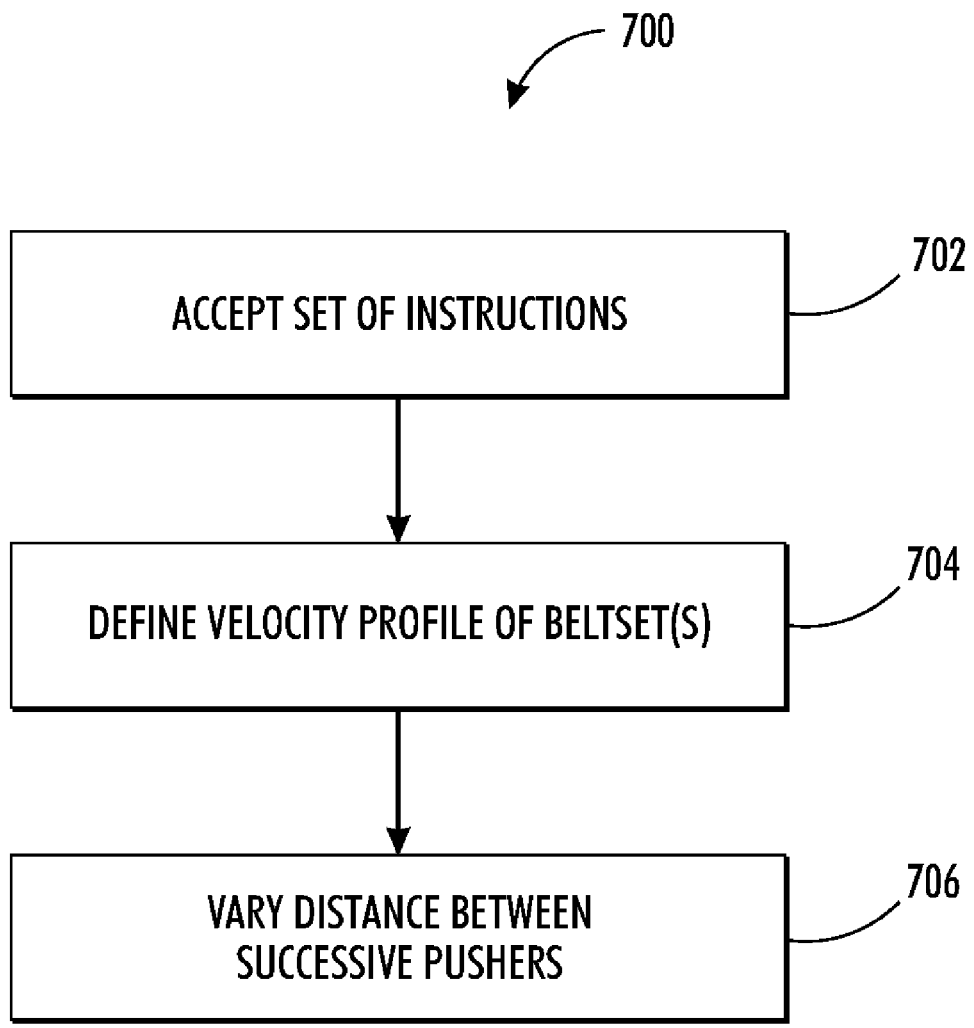
FIG. 7 is a flowchart of an exemplary method for tamping media stacks during transportation.

FIG. 7 is a flowchart of an exemplary method 700 for tamping media stacks during transportation. The exemplary method 700 is implemented in the embodiment described in relation with the transport system 100 and related embodiments, although it will be apparent to those of skill in the art that the various embodiments of the methods for tamping media presented in this disclosure may be implemented in any appropriate conveyor system environment that allows controlled, automatic pusher movement.

In the present embodiment, a media stack is tamped at least once during its transport from the inlet station to the delivery station. The tamping operations may occur at predetermined time intervals. Moreover, the tamping operations may occur at periodic time intervals in certain embodiments.

The control module 120 accepts a set of instructions at step 702 of the method 700. The set of instructions may specify various parameters determining belt movement, such as the media type and size, stack size, the locations of the inlet or delivery stations, and other parameters that can affect tamping requirements. Further, the set of instructions may include a preprogrammed algorithm specifying details of the tamping operations, such as the timing, frequency, and belt velocities. The algorithm may be stored on a portable computer-readable storage medium or on a memory unit within the control module 120. Alternatively, a user can input the set of instructions to the control module 120 through a user interface, employing a keyboard or touch-screen, as well as a display device allowing the user to view information related to an ongoing or scheduled operation.

The control module 120 can further define a velocity profile at step 704 for one or both of the first motor 106, the second motor 108, and corresponding belts, based on the instruction set. The velocity profile defines the velocities of the beltsets, so that, for example, the first belt 102 and the second belt 104 may move at the same speed, in the same direction, for a predetermined time. Further instructions can cause the first belt 102 may to move at a slower speed, resulting in a tamping operation.

The control module 120 varies the distance between two successive pushers on the transport system 100 (bin size) at step 706 based on the set of instructions. For example, the control module 120 can accept a set of instructions resulting in a tamping operation each time a bin passes below an additional inlet station, placed above the belts. The set of instructions provides the number of tamping operations and the associated points in time at which the tamping operations occur. If the number of tamping operations is to be equal to the number of additional inlet stations, the control module 120 defines a velocity profile for the first beltset 101 and the second beltset 103, which actuates the first motor 106 and the second motor 108 to move the first belt 102 and the second belt 104, respectively at equal velocities in direction A in FIG. 1 during certain predetermined time intervals. Further, the velocity profile actuates the first motor 106 to move the first belt 102 in a direction opposite to direction A (right to left) effectively, performing a tamping operation according to the points in time specified by the set of instructions. The effective right to left movement may decrease the velocity of the second belt 104 or even reverse the direction of the second belt's 104 movement. Moreover, the set of instructions may include the size of the media being transported, such that the velocity profile can facilitate tamping of the media stack based on the media size. Such instructions preclude the possibilities of over-tamping, which leads to crushing of the media or under-tamping that results in an unregistered media stack. Those of skill in the art will readily comprehend that various other instructions and parameters, in addition to those already discussed here, may be employed for implementing tamping operations as required.

In certain embodiments, the method 700 increases the bin size for collecting media from an inlet station. In some embodiments, the method 700 decreases the bin size for tamping the media stack being transported, as described in relation with FIG. 1.

Figure 8:
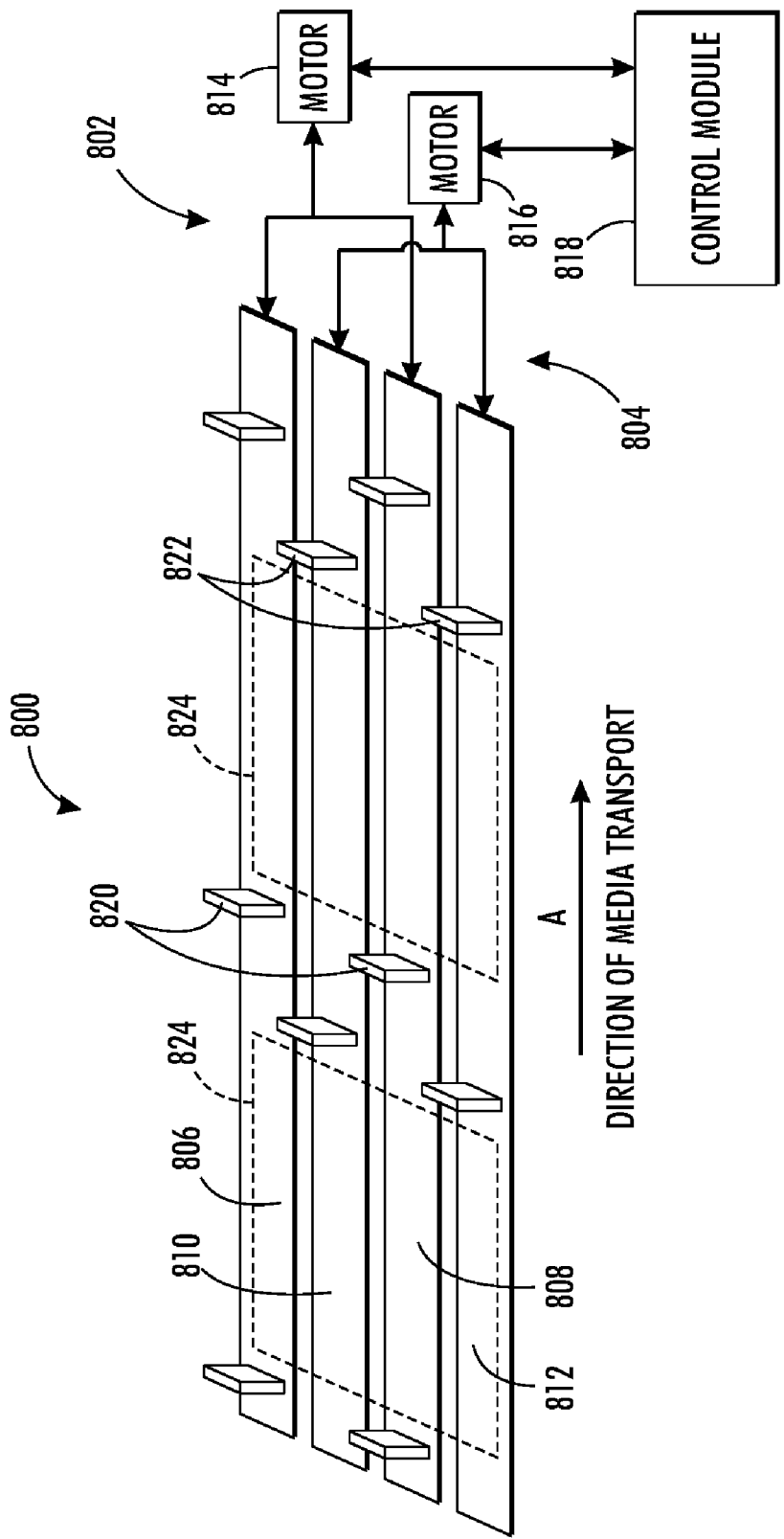
FIG. 8 exhibits an exemplary transport system, which is an alternate embodiment of the transport system of FIG. 1, having two belts in each beltset.

FIG. 8 exhibits an exemplary transport system 800, an alternate embodiment of the transport system 100 of FIG. 1, having two belts in each beltset. The system 800 includes two parallel beltsets—a first beltset 802 and a second beltset 804. The first beltset 802 includes a first belt 806 and a second belt 808. Similarly, the second beltset 804 includes a first belt 810 and a second belt 812. A first motor 814, driving the first beltset 802, and a second motor 816, driving the second beltset 804, are coupled to a control module 818.

The pushers of this embodiment differ significantly from the tamping and TE pushers described previously. Here, individual pushers, such as pusher-sets 820 and 822 are tab-like structures that only span a fraction of the width of each belt, rather than completely spanning both beltsets. For instance, while transporting a media stack including media that spans all the belts of a transport system, small, tab-like pushers (as shown in the exemplary transport system 800) perform tamping satisfactorily. When transporting a media stack including smaller media that does not span all the belts, however, pushers that span all the belts in the transport system (as shown in FIG. 1) are required to prevent the media from becoming unregistered due to rotating or shifting. As will be recognized by those of skill in the art, several conceivable pusher structures may be employed for forming bins of varying sizes, tamping media effectively, and preventing media from becoming unregistered. The operation of the exemplary transport system 800 is as described in relation with FIG. 1 to FIG. 7.

Figure 9:
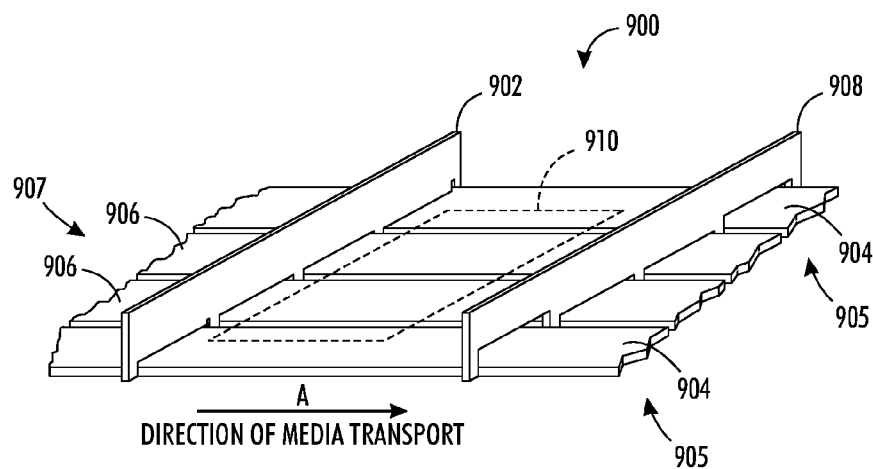
FIG. 9 illustrates an alternate embodiment of the transport system of FIG. 8.

FIG. 9 illustrates an alternate embodiment of the exemplary transport system 800. Here, a transport system 900 presents an alternate pusher structure and includes two parallel beltsets having two parallel belts each. Pusher 902 is attached to belts 904 of a second beltset 905 and spans belts 906 of a first beltset 907. Similarly, pusher 908 spans the belts 904 of the second beltset 905 and is attached only to the belts 906 of the first beltset 907. FIG. 9 displays the belts 904 of the second beltset 905 separated by the belts 906 of the first beltset 907, which lie in the middle of the two belts 904 of the second beltset 905. Media, for transportation, is placed between the pushers 902 and 908 that form a bin 910 (shown in dotted lines). In this manner, the whole length of the media remains confined to the bin 910 and the media does not topple during transportation. The operation of the transport system 900 is as described in relation with FIG. 1 to FIG. 7.

Figure 10:
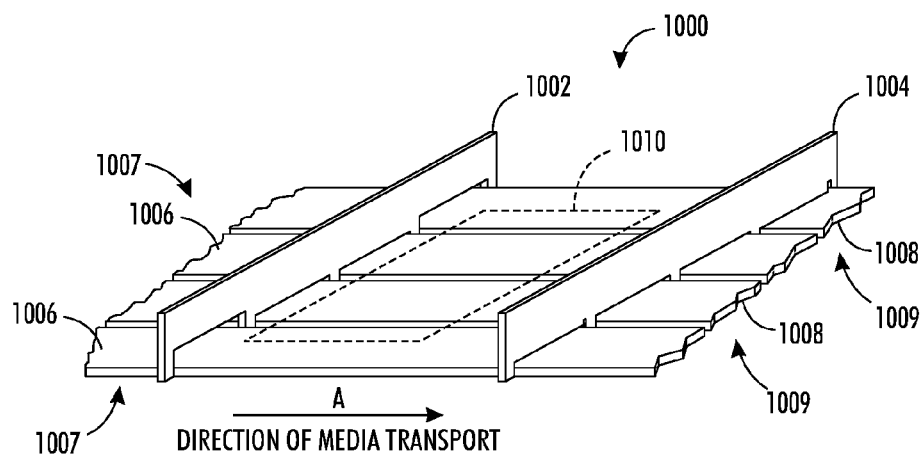
FIG. 10 illustrates an alternate embodiment of the transport system of FIG. 8.

FIG. 10 illustrates an alternate embodiment of the exemplary transport system 800. Here, transport system 1000 presents an alternative pusher structure where pushers 1002 and 1004 span belts 1006 of a second beltset 1007 and belts 1008 of a first beltset 1009. The pusher 1002 is attached to the belts 1006 of the second beltset 1007 while the pusher 1004 is attached to the belts 1008 of the first beltset 1009. The belts 1006 of the second beltset 1007 intercalate with the belts 1008 of the first beltset 1009, as shown in FIG. 10. A media stack is placed between the pushers 1002 and 1004 that form a bin 1010 (shown in dotted lines). The operation of the transport system 1000 is as described in relation with FIG. 1 to FIG. 7.

As illustrated in FIGS. 9 and 10, a pusher may be attached to each belt in a beltset. In this case, more than two belts in a beltset results in multiple attachment points for a pusher, which strengthens the pusher structure and prevents the pusher from being deformed. The likelihood of pusher deflection reduces, as this pusher structure is far more robust as compared to a pusher attached to only one belt.

It will be obvious to those skilled in the art that several conceivable pusher and beltset structures may be employed for forming bins of varying sizes, preventing media scatter, without departing from the scope and intended functions of the claimed invention.

While this specification contains many specific implementation details, these should not be construed as limitations on the scope of any invention or of what may be claimed, but rather as descriptions of features, that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Similarly, while operations are depicted in the drawings in a particular order, this should not be understood as requiring that such operations be performed in the particular order shown or in sequential order, or that all illustrated operations be performed, to achieve desirable results. Various presently unforeseen or unanticipated alternatives, modifications, variations, or improvements therein may be subsequently made by those skilled in the art, which are also intended to be encompassed by the following claims.

I claim:

1. A method of tamping media during transportation comprising:

providing one or more beltsets carrying a media set, each beltset including:
  one or more parallel belts;
  a motor operatively connected to drive the beltset; and
  a plurality of pushers attached to the one or more belts of the beltset, the pushers being spaced apart at least a distance greater than the largest media to be transported,
  wherein the pushers of one beltset are situated between successive pushers of the adjacent beltset; and
tamping the media set, at least once during the transport of the media set, wherein the tamping occurs at predetermined time intervals through a control module performing the steps of:
  accepting a set of instructions;
  defining a velocity profile for the one or more beltsets; and varying the distance between two successive pushers on the one or more beltsets during the transport of the media set.

2. The method of claim 1, wherein a pusher includes one or more protrusions from the lower part of the pusher.

3. The method of claim 1, wherein the media size is variable.

4. The method of claim 1, wherein the predetermined time intervals are periodic intervals.

5. The method of claim 1, wherein the tamping step includes increasing the distance between two successive pushers on the beltset for collection of media.

6. The method of claim 1, wherein the tamping step includes decreasing the distance between two successive pushers on the beltset for tamping the media set being transported.

7. The method of claim 1 further comprising attaching the pushers to the belt by welding.

8. The method of claim 1 further comprising attaching the pushers to the belt by mechanical coupling.

9. The method of claim 1 further comprising spanning the width of the one or more beltsets by the pushers.

10. The method of claim 1 further comprising spanning a fraction of the width of the one or more beltsets by the pushers.

11. The method of claim 1 further comprising providing the set of instructions as a preprogrammed algorithm.

12. The method of claim 1 further comprising providing the set of instructions through a user interface.

13. A method of tamping media during transportation comprising:
providing one or more beltsets carrying a media set, each beltset including:
one or more parallel belts;
a motor operatively connected to drive the beltset; and
a plurality of pushers attached to the one or more belts of the beltset, the pushers being spaced apart at least a distance greater than the largest media to be transported,
wherein the pushers of one beltset are situated between successive pushers of the adjacent beltset;
accepting media from the one or more inlet stations; and
tamping the media set at least once during the transport of the media set, wherein the tamping occurs at predetermined time intervals through a control module performing the steps of:
accepting a set of instructions;
defining a velocity profile for the one or more beltsets;
increasing the distance between two successive pushers on the beltset for collection of media; and
decreasing the distance between two successive pushers on the beltset for tamping the media set being transported.

14. The method of claim 13, wherein a pusher includes one or more protrusions from the lower part of the pusher.

15. The method of claim 13, wherein the predetermined time intervals are periodic intervals.

16. The method of claim 13 further comprising spanning the width of the one or more beltsets by the pushers.

17. The method of claim 13 further comprising spanning a fraction of the width of the one or more beltsets by the pushers.

18. The method of claim 13 further comprising providing the set of instructions as a preprogrammed algorithm.

19. The method of claim 13 further comprising providing the set of instructions through a user interface.

20. A system for tamping media during transportation, the system comprising:
one or more adjacent parallel beltsets, each beltset including:
one or more parallel belts;
a motor operatively connected to drive the beltset; and
a plurality of pushers attached to the one or more belts of the beltset, the pushers being spaced apart at least a distance greater than the largest media to be transported;
wherein the pushers of one beltset are situated between successive pushers of the adjacent beltset; and
a control module configured to tamp the media set, at least once during the transport of the media set, wherein the tamping occurs at predetermined time intervals, the control module performing the steps of:
accepting a set of instructions;
defining a velocity profile for the one or more beltsets; and
varying the distance between two successive pushers on the one or more beltsets during the transport of the media set.

21. The system of claim 20, wherein the control module is configured to increase the distance between two successive pushers on the beltset during collection of media.

22. The system of claim 20, wherein the control module is configured to tamp the media set by decreasing the distance between two successive pushers on the beltset during media set transportation.

* * * * *